United States Patent
Aliyev et al.

(10) Patent No.: US 9,988,467 B2
(45) Date of Patent: Jun. 5, 2018

(54) POLYMERIZATION PROCESS FOR THE PRODUCTION OF HIGH DENSITY POLYETHYLENE

(71) Applicant: Saudi Basic Industries Corporation, Riyadh (SA)

(72) Inventors: Vugar Aliyev, Riyadh (SA); Ian Blackmore, Riyadh (SA)

(73) Assignee: SAUDI BASIC INDUSTRIES CORPORATION, Riyadh (SA)

(*) Notice: Subject to any disclaimer, the term of this patent is extended or adjusted under 35 U.S.C. 154(b) by 123 days.

(21) Appl. No.: 14/780,236

(22) PCT Filed: Mar. 27, 2014

(86) PCT No.: PCT/EP2014/056119
§ 371 (c)(1),
(2) Date: Sep. 25, 2015

(87) PCT Pub. No.: WO2014/154784
PCT Pub. Date: Oct. 2, 2014

(65) Prior Publication Data
US 2016/0046739 A1 Feb. 18, 2016

Related U.S. Application Data

(60) Provisional application No. 61/927,091, filed on Jan. 14, 2014.

(30) Foreign Application Priority Data

Mar. 28, 2013 (EP) .................................. 13001636

(51) Int. Cl.
C08F 4/69 (2006.01)
C08F 110/02 (2006.01)
C08J 5/00 (2006.01)

(52) U.S. Cl.
CPC .............. *C08F 110/02* (2013.01); *C08F 4/69* (2013.01); *C08J 5/00* (2013.01); *C08J 2323/06* (2013.01)

(58) Field of Classification Search
CPC .................................. C08F 4/69; C08F 10/02
See application file for complete search history.

(56) References Cited

U.S. PATENT DOCUMENTS

| 2,825,721 A | 3/1958 | Hogan et al. |
| 4,559,394 A | 12/1985 | McDaniel |
| 4,728,703 A * | 3/1988 | Konrad ............... C08F 10/02 502/113 |
| 5,965,675 A | 10/1999 | Kellum et al. |
| 2006/0063666 A1 | 3/2006 | Rohde et al. |
| 2015/0099855 A1* | 4/2015 | Hamed ............... C08F 10/02 526/113 |

FOREIGN PATENT DOCUMENTS

| CN | 101173013 A | 5/2008 |
| WO | 0218046 A1 | 3/2002 |
| WO | 2012045426 A1 | 4/2012 |

OTHER PUBLICATIONS

International Search Report and Written Opinion for PCT/EP2014/056119 dated May 15, 2014, 7 pages.
Peacock, Andrew, "Handbook of Polyethylene, Structures, Properties, and Applications", Marcel Dekker, Inc., NY, NY, pp. 61-64 (2000).
Pullukat, T. J., "A Chemical Study of Thermally Activated Chromic Titanate on Silica Ethylene Polymerization Catalysts", Journal of Polymer Science, Polymer Chemisty Edition, vol. 18, 2857-2866 (1980).

* cited by examiner

*Primary Examiner* — Caixia Lu
(74) *Attorney, Agent, or Firm* — Cantor Colburn LLP

(57) ABSTRACT

The invention relates to a polymerization process for the production of high density polyethylene by polymerization of ethylene in the presence of a catalyst composition comprising a chromium compound, a support material wherein the alcohol is a primary alcohol having the formula (I) wherein R, R' and R" are the same or different and respectively represent a linear or branched alkyl, cycloalkyl, phenyl or phenyl containing radicals comprising from 5 to 15 carbon atoms and wherein only one of R, R' or R" can be a hydrogen radical and/or wherein the alcohol is a secondary alcohol and/or a secondary cyclic alcohol. The catalyst composition may also comprise a titanium compound. The high density polyethylene may be applied in the production of blow molded articles.

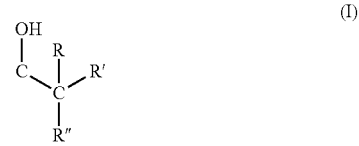

(I)

16 Claims, No Drawings

POLYMERIZATION PROCESS FOR THE PRODUCTION OF HIGH DENSITY POLYETHYLENE

This application is a national stage application of PCT/EP2014/056119 filed Mar. 27, 2014, which claims priority to European Application 13001636.3 filed Mar. 28, 2013 and U.S. Provisional Application Ser. No. 61/927,091 filed Jan. 14, 2014, all of which are hereby incorporated by reference in their entirety.

The invention is directed to a process for the production of high density polyethylene by polymerisation of ethylene in the presence of a chromium oxide based catalyst.

The production processes of LDPE, HDPE and LLDPE are summarised in "Handbook of Polyethylene" by Andrew Peacock (2000; Dekker; ISBN 0824795466) at pages 43-66. The catalysts can be divided in three different subclasses including Ziegler Natta catalysts, Phillips catalysts and single site catalysts. The various processes may be divided into solution polymerisation processes employing homogeneous (soluble) catalysts and processes employing supported (heterogeneous) catalysts. The latter processes include both slurry and gas phase processes.

A chromium oxide based catalyst, which is commonly referred to in the literature as "the Phillips catalyst", can be obtained by calcining a chromium compound carried on an inorganic oxide carrier in a non-reducing atmosphere. The chromium oxide catalysis and the ethylene polymerisation with this specific catalyst are disclosed in "Handbook of Polyethylene" by Andrew Peacock at pages 61-64.

Pullukat et al. (Journal of Polymer Science; Polymer chemistry Edition; vol 18, 2857-2866; 1980) discloses thermally activated ethylene polymerisation catalysts which contain chromium and titanium on silica.

It is a disadvantage of ethylene polymerisation catalysts which contain chromium and titanium on silica that they cannot be applied in the polymerisation of ethylene in a gas phase reactor process to obtain polymers with relatively low melt indices, for example in the range between 5 to 10 ($MI_{21.6\,kg}$), because said catalyst must be run at very low bed temperatures in a gas phase process. The temperature drops at this stage to a temperature in the range of 92 to 98 degrees Celsius resulting in a very low production rate.

It is the object of the present invention to provide a catalyst composition having a high activity in gas phase polymerisation processes while producing high density polyethylene (HDPE) of low melt index values.

The catalyst composition according to the invention comprises a chromium compound, an alcohol and a support material characterized in that the alcohol is a primary alcohol having the formula:

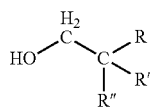

wherein R, R' and R" are the same or different and respectively represent a linear or branched alkyl, cycloalkyl, phenyl or phenyl containing radicals comprising from 5 to 30, preferably 5-15, carbon atoms and wherein only one of R, R' or R" is a hydrogen radical and/or
the alcohol is a secondary alcohol and/or
the alcohol is a secondary cyclic alcohol.

According to a preferred embodiment of the invention the alcohol is a secondary cyclic alcohol.

According to a preferred embodiment of the invention the catalyst composition applied in the process according to the invention comprises additionally a titanium compound.

According to a further preferred embodiment of the invention the primary alcohol is selected from cyclohexanemethanol, 2-ethylhexanol and 2,2-dimethylpropanol.

According to another preferred embodiment of the invention the secondary alcohol is selected from secondary alcohols having the formula:

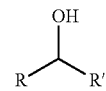

wherein R and R' are the same or different and respectively represent a linear or branched alkyl, cycloalkyl, phenyl or phenyl containing radicals comprising from 5 to 30, preferably from 5 to 15, carbon atoms.

According to a further preferred embodiment of the invention the secondary alcohol is selected from 4-methyl-2-pentanol, 3-pentanol, 1,1-diphenylmethanol, and 1,1-diphenylethanol.

According to another preferred embodiment of the invention the secondary alcohol is selected from secondary cyclic alcohols having the formula:

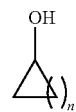

wherein n is from 1 to 13 and cyclic ring represent a linear or branched alkyl radical comprising 3-30, preferably 3-15, carbon atoms or one or more phenyl or phenyl containing radicals.

According to a preferred embodiment of the invention the cyclic alcohol is selected from cyclohexanol, cyclopentanol, cycloheptanol and fluorenol.

It is possible to apply mixtures of alcohols for example a primary alcohol or a secondary alcohol can be mixed with a secondary cyclic alcohol.

Preferably the mixture comprises a secondary cyclic alcohol as the main component in combination with a smaller amount of either primary or secondary alcohol.

A preferred mixture comprises a secondary cyclic alcohol and a primary alcohol with a weight ratio primary alcohol:secondary cyclic alcohol ranging between 1:9 and 3:7.

The most preferred secondary cyclic alcohol is cyclohexanol.

The chromium compound can be selected from various organic and inorganic forms of chromium.

Preferably the chromium compound is selected from chromium acetate, chromium acetyl acetonate, chromium acetate hydroxide and chromium trioxide. Most preferably chromium acetate or chromium acetyl acetonate is applied.

The catalyst can be formed prior to the polymerization of ethylene or within the polymerization reaction zone and the applied alcohol must react with the activated chromium oxide ($Cr^{6+}$) catalyst before introduction of ethylene.

Alcohols such as tertiary alcohols, for example t-butyl alcohol, and primary alcohols, for example ethanol, are not suitable to be applied in the present invention.

Suitable support materials include for example inorganic oxides of silica, alumina, silica-alumina mixture, thoria, zirconia and comparable oxides which are porous, have a medium surface area, and have surface hydroxyl groups. Supported chromium catalysts are described for example, in U.S. Pat. No. 2,825,721. The support may be modified so as to include cogels such as for example silica-titania or silica-alumina and by the replacement of silica by alumina or amorphous aluminum phosphates. The silica support may also be doped with chemical compounds containing for example aluminum, titanium, phosphorus, boron or fluorine.

According to a preferred embodiment of the invention the support material is a silica support material.

Preferably the spherical silicon oxide support material has a surface area (SA) larger than 150 m$^2$/g and a pore volume (PV) larger than 0.8 cm$^3$/g.

More preferably the spherical silicon oxide support material has a surface area (SA) in the range between 250 and 500 m$^2$/g and a pore volume (PV) in the range between 1.1 and 2.0 cm$^3$/g.

Suitable examples of titanium compounds include titanium compounds which are oxidizable to TiO$_2$ under the activation conditions. Examples of suitable titanium compounds having the general formula Ti (OR$^1$)nX$_{4-n}$ and Ti (R$^2$)$_n$X$_{4-n}$.

Suitable titanium alkoxy compounds include for example tetraethoxy titanium, tetramethoxy titanium, tetrabutoxy titanium, tetrapropoxy titanium, titanium tetraisopropoxide, tetraisobutoxy titanium, tetrapentoxy titanium, triethoxychloro titanium, diethoxydichloro titanium, trichloethoxy titanium, methoxy titanium trichloride, dimethoxy titanium dichloride, ethoxy titanium trichloride, diethoxy titanium dichloride, propoxy titanium trichloride, dipropoxy titanium dichloride, butoxy titanium trichloride, butoxy titanium dichloride and titanium tetrachloride and mixtures thereof.

Suitable organic oxygen containing titanium compound may be represented by the general formula [TiO$_x$(OR)$_{4-2x}$]$_n$ in which R represents an organic radical, x ranges between 0 and 1 and n ranges between 1 and 6.

Suitable examples of organic oxygen containing titanium compounds include alkoxides, phenoxides, oxyalkoxides, condensed alkoxides, carboxylates and enolates.

According to a preferred embodiment of the invention the organic oxygen-containing titanium compounds is a titanium alkoxide.

Suitable alkoxides include for example Ti (OC$_2$H$_5$)$_4$, Ti (OC$_3$H$_7$)$_4$, Ti (OC$_4$H$_9$)$_4$, and Ti (OC$_8$H$_{17}$)$_4$.

According to a preferred embodiment of the invention the titanium compound is titanium tetraisopropoxide (Ti (OC$_3$H$_7$)$_4$).

The treatment of the activated chromium oxide based catalyst with the specific alcohol provides a highly active catalyst which produces a high density polymer with lower melt index values.

The present catalyst composition exhibits higher activity and greater stability during the polymerization process.

It is a further advantage of the present invention that the obtained high molecular weight HDPE is suitable to be applied for the production of large-part blow molded articles, for example drums and jerry cans. Generally, HDPE grades for customer jerry can applications have a melt flow rate (190° C./21.6 kg) between 2 g/10 min and 10 g/10 min and a density between 945 kg/m$^3$ and 955 kg/m$^3$.

The presence of titanium may increase the activity of the catalyst, first by shortening the induction time, and then by allowing higher polymerization rates. Furthermore the presence of titanium may result in broadening the polymer molecular weight distribution (MWD) which can be useful in for example blow moulding applications.

The catalyst is prepared by the reaction of the chromium compound with the porous support, followed by the activation at high temperature in the presence of dry air and then by a reaction with the alcohol.

The titanium compound can be added to the unactivated chromium on silica catalyst followed by activation in dry air at high temperature, in order to convert Cr ($^{3+}$) to Cr ($^{6+}$). The alcohol is added to the activated Cr/Ti/SiO$_2$ or Cr/SiO$_2$ catalyst.

Preferably, the olefin polymerisation catalyst is prepared by pre contacting the supported activated chromium oxide based catalyst with the alcohol before introducing the catalyst into the reactor.

Generally, the molar ratio of alcohol to chromium ranges between 0.1:1 and 5:1. Preferably, the molar ratio of alcohol to chromium ranges between 0.1:1 and 3:1.

Generally, the amount of chromium in the final catalyst ranges between 0.2 and 5% by weight, more preferably ranges between 0.3 and 2% by weight.

Generally, the catalyst drying temperature is within the range of 20-60° C.

The titanium in the catalyst will be present in an amount sufficient to increase the melt index ratio of the polymer produced. Generally, the titanium content of the catalyst can be in the range of from 0.1 to 10 weight percent, preferably in the range of from 0.1 to 6 weight percent.

The polymerization may be performed via a gas phase process or via a slurry process.

The process according to the invention may be applied for ethylene polymerization to medium and high density polyethylene and copolymers of ethylene with alpha-olefins having about 3 to 18 carbon atoms. The produced polyethylene may be HDPE and LLDPE.

The obtained HDPE is suitable to be applied in the production of large-part blow molded articles, for example drums and jerry cans and high molecular weight film applications.

U.S. Pat. No. 4,559,394 discloses a catalyst produced by contacting an activated silica-titania supported chromium composition with a tertiary alcohol and thereafter reactivating under relatively mild conditions. The catalyst offers the advantage of allowing polymerization at a lower reactor temperature to achieve a given melt flow.

U.S. Pat. No. 5,965,675 discloses a polymerization process using a chromium/titanium-containing catalyst and a taming agent selected from the group consisting of water, alcohols, aldehydes, ketones, esters, and organic acids and preferably ethanol, water or ethylacetate. The process is especially suitable for the production of polyethylene resins suitable for blow molding use. A disadvantage of this process is the lower productivity in the case that the taming agent is applied.

WO0218046 discloses a supported chromium catalyst system comprising reaction a chromium catalyst precursor with a functionalized support in a solvent to bind said chromium catalyst precursor to a functionalized support via at least one heteroatom attached to said support via an organic group. The support materials are acrylate polymer particles or styrene divinyl benzene polymer particles. Suitable examples of these polymer based supports, include p-hydroxymethylstyrene-co-divinylbenzene polymer, p-(1,2-dihydroxyethyl) styrene-co-styrene-co-divinylbenzene polymer and p-vinylphenol-co-styrene-co-divinylbenzene copolymer. Suitable chromium precursors are trisallyl-chromium, tris-(2-methylallyl) chromium or (Ph$_3$SiO)$_2$CrO$_2$. In contrast to WO0218046 in the present invention the preferred support is silica support and a chromium precursor (for example, chromium acetate or chromium acetyl acetonate) is mixed with the silica support, then chromium/silica mixture is calcined/activated at high temperature (700° C. and above) in the presence of a dry air. The next step is the treatment of silica supported activated CrOx catalyst with an alcohol. In WO0218046 chromium is bond to the polymeric support via an organic group, while in the present invention chromium is bond to silica support directly.

The invention will be elucidated by means of the following non-limiting examples.

EXAMPLES

The properties of the polymers produced in the Examples were determined as follows:

The high load melt index (HLMI) is determined using the procedures of ASTM D-1238 Condition F using a load of 21.6 kg at a temperature of 190° C.

Bulk density was measured according to ASTM D-1895.

Polymer molecular weight and its distribution (MWD) were determined by Polymer Labs 220 gel permeation chromatograph (GPC). The chromatograms were run at 150° C. using 1,2,4-trichlorobenzene as the solvent with a flow rate of 0.9 ml/min. A refractive index detector is used to collect the signal for molecular weights. The software used is Cirrus from PolyLab for molecular weights from GPC. The calibration of the HT-GPC uses a Hamielec type calibration with broad standard and fresh calibration with each sample set.

Example I and Comparative Examples A-C

Catalyst Preparation

Comparative Example A

A silica supported chromium oxide based catalyst having 0.38 wt % of chromium (chromium containing precursor is chromium (III) acetylacetonate), 3.8 wt % of titanium (titanium containing precursor is titanium(IV isopropoxide), a surface area of 300 m$^2$/g and a pore volume of 1.5 cm$^3$/g.

was activated in an atmosphere of dry air at a temperature of 825° C. for 3 hours using a tube furnace. The orange catalyst obtained indicates the presence of hexavalent chromium atoms.

Example I 1 gram of previously activated catalyst according to Comparative Example A was placed in a 40 cm$^3$ flask. 10 cm$^3$ of isopentane was added to slurry the activated catalyst, then a 1M isopentane solution of cyclohexanol was added to the flask and the resultant mixture agitated. It then stood for 60 minutes at a temperature of 25° C. The slurry was dried under vacuum or using a nitrogen purge at a temperature of 25° C. The modified catalyst was stored under nitrogen until use. The catalyst was pale green in color. The mole ratio of cyclohexanol to chromium was 1:1.

Comparative Example B

The catalyst was prepared in the same manner as that in Example I except that cyclohexanone was applied instead of cyclohexanol. The catalyst was yellow-orange in color.

Comparative Example C

The catalyst was prepared according to the process in Example I except that t-butyl alcohol was applied instead of cyclohexanol. The catalyst was yellow-orange in color.

Example II and Comparative Examples D-F

Ethylene Polymerisation

An autoclave with a volume of 2 liters was purged with nitrogen at 150° C. for 30 minutes. After cooling the autoclave to 90° C., one liter of isopentane was introduced to the reactor and then the reactor was pressurized up to 20 bar with ethylene. Then 0.1 ml of TEAL solution (1M) was injected into the reactor to scavenge the impurities, followed by 0.20 g of the solid catalyst as described in Table 1 after being slurried in 20 cm$^3$ of isopentane. The reactor temperature was raised to 100° C. Ethylene polymerization was carried out for 1 hour or until terminated sooner, with ethylene supplied on demand to maintain the total reactor pressure at 20 bars. Upon completion of the polymerization, the reactor was vented and cooled to ambient temperature to recover the polymer.

TABLE 1

| Catalyst | | Color of catalyst | Time (min) | Polymer Yield g | Productivity gPE/gcat. 1 hr | B.D. g/cc | HLMI g/10 min. |
|---|---|---|---|---|---|---|---|
| D | A | orange | 60 | 340 | 1700 | 0.36 | 2.2 |
| II | I | green | 53 | 340 | 1925 | 0.38 | 1.5 |
| E | B | yellow-orange | 60 | 164 | 820 | 0.34 | 7.4 |
| F | C | yellow-orange | 60 | 156 | 780 | 0.36 | 9.1 |

The results in Table 1 show that the catalysts with cyclohexanol produce ethylene polymers having a high load melt index (HLMI) lower than the catalysts without cyclohexanol under similar reaction conditions. Cyclohexanone and t-butyl alcohol treated chromium oxide based catalysts produced ethylene polymers having much higher HLMI under similar reaction conditions.

TABLE 2

| Catalyst | | Mw | Mn | MWD | Mz | Mz + 1 |
|---|---|---|---|---|---|---|
| D | A | 229163 | 17713 | 13 | 1142678 | 2380560 |
| II | I | 264231 | 17288 | 15 | 1455630 | 2989662 |
| E | B | 195581 | 14100 | 13.8 | 898309 | 1704393 |
| F | C | 177187 | 12832 | 13.8 | 881031 | 1736066 |

The results in Table 2 show that the catalyst used in the process according to the invention produces ethylene polymer having higher molecular weight, as well as higher Mz and Mz+1 value.

In Table 1:

Mz and Mz+1 are higher average molecular weights

Mw: weight-average molecular weight

Mn: number-average molecular weight

MWD (molecular weight distribution) is the ratio of weight-average molecular weight (Mw) to number-average molecular weight (Mn), i.e., Mw/Mn and used as a measure of the broadness of molecular weight distribution of a polymer.

wherein

Mw is related to strength properties (tensile, impact resistance).

Mn is related to brittleness, flow properties.

Mz is related to elongation and flexibility.

Mz+1 is related to die swell.

Comparative Example G

Comparative Example A was repeated without titanium. A silica supported chromium oxide based catalyst having 0.3 wt % of chromium, a surface area of 300 m²/g and a pore volume of 1.5 cm³/g.

was activated in an atmosphere of dry air at a temperature of 750° C. for 3 hours using a tube furnace. The orange catalyst obtained indicates the presence of hexavalent chromium atoms.

Examples III-IV

Comparative Example G was repeated with use of cyclohexanol as indicated in Table 3 to obtain catalysts III-IV.

Example II was repeated with use of the catalysts III-IV and Comparative Example G.

TABLE 3

| catalyst | Alcohol | Color of catalyst | Alcohol/Cr molar ratio | Productivity gPE/gcat 1 hr | B.D. (g/cc) | HLMI (g/10 min.) |
|---|---|---|---|---|---|---|
| G | untreated | yellow | — | 610 | 0.33 | 0.75 |
| III | cyclohexanol | green | 1:1 | 740 | 0.32 | 0.67 |
| IV | cyclohexanol | green | 1.5:1 | 670 | 0.32 | 0.65 |

Table 4 shows that the addition of cyclohexanol increases the productivity of the catalyst and lowers HLMI of the gained resin in the absence of titanium as well.

Example V and Comparative Example F

A comparison between a catalyst comprising a chromium oxide on silica (Cr=0.4 wt %; Ti=2 wt %) and the same catalyst with the exception that the catalyst is treated with ethanol instead of cyclohexanol gives the results according to Table 4.

TABLE 4

| Catalyst | Alcohol | Alcohol/Cr molar ratio | Productivity gPE/gcat. 1 hr | B.D. (g/cc) |
|---|---|---|---|---|
| | untreated | — | 1185 | 0.32 |
| | cyclohexanol | 1:1 | 1825 | 0.34 |
| | ethanol | 1:1. | 950 | 0.31 |

The results in Table 5 show that cyclohexanol treated chromium oxide catalyst has higher productivity compared to the untreated chromium oxide catalyst, while ethanol treated catalyst productivity is much lower compared to the untreated catalyst.

The invention claimed is:

1. A polymerization process for the production of high density polyethylene by polymerization of ethylene in the presence of a catalyst composition comprising a chromium compound, an alcohol, and a support material, wherein the alcohol is a primary alcohol and/or a secondary alcohol, characterised in that the primary alcohol has the formula:

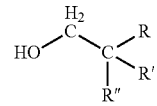

wherein R, R', and R" are the same or different and each respectively represents a linear or branched alkyl, cycloalkyl, phenyl, or phenyl containing radicals comprising from 5 to 30 carbon atoms, and with the proviso that only one of R, R', or R" is a hydrogen radical.

2. A process according to claim 1 characterised in that the catalyst composition additionally comprises a titanium compound.

3. A process according to claim 1, characterised in that the alcohol is the secondary alcohol having the formula:

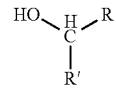

wherein R and R' are the same or different and respectively each represents a linear or branched alkyl, cycloalkyl, phenyl, or phenyl containing radicals comprising from 5 to 30 carbon atoms.

4. A process according to claim 3 characterised in that the secondary alcohol is selected from 4-methyl-2-pentanol, 3-pentanol, 1,1-diphenylmethanol, and 1,1-diphenylethanol.

5. A process according to claim 1 characterised in that the alcohol is the secondary alcohol that is a secondary cyclic alcohols having the formula:

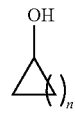

wherein n is from 1 to 13, and the cyclic ring represents a cycloalkane comprising from 3 to 5 carbon atoms, optionally substituted with a linear or branched alkyl radical, one or more phenyl rings, or one or more phenyl containing radicals comprising from 1 to 15 carbon atoms.

6. A process according to claim 5 characterised in that the secondary cyclic alcohol is selected from cyclohexanol, cyclopentanol, cycloheptanol and fluorenol.

7. A process according to claim 1 characterised in that the primary alcohol is selected from cyclohexanemethanol, 2-ethylhexanol and 2,2-dimethylpropanol.

8. A process according to claim 1 characterised in that the support material is silica support material.

9. A process according to claim 1 characterised in that the chromium compound is selected from chromium acetate, chromium acetyl acetonate, chromium acetate hydroxide and chromium trioxide.

10. A process according to claim 2 characterised in that the titanium compound is a titanium alkoxide.

11. A process according to claim 5 characterised in that the catalyst composition additionally comprises a titanium compound.

12. A process according to claim 5 characterised in that the support material is silica support material.

13. A process according to claim 5 characterised in that the chromium compound is selected from chromium acetate, chromium acetyl acetonate, chromium acetate hydroxide and chromium trioxide.

14. A process according to claim 11 characterised in that the titanium compound is a titanium alkoxide.

15. A polymerization process for the production of high density polyethylene by polymerization of ethylene in the presence of a catalyst composition, the process comprising:
   combining a chromium compound and a support material to provide a supported catalyst;
   contacting an alcohol with the supported catalyst to form a catalyst composition; and
   polymerizing ethylene using the catalyst composition,
   wherein the alcohol is a primary alcohol and/or a secondary alcohol.

16. A process according to claim 15, characterised in that the catalyst composition additionally comprises a titanium compound.

* * * * *